US012807232B2

(12) United States Patent
Kellner et al.

(10) Patent No.: US 12,807,232 B2
(45) Date of Patent: Nov. 24, 2026

(54) VEHICLE FRONT FRAME ASSEMBLY

(71) Applicant: Dr. Ing. h.c. F. Porsche Aktiengesellschaft, Stuttgart (DE)

(72) Inventors: Philipp Kellner, Renningen-Malmsheim (DE); Scally Rommelfanger, Bad Liebenzell (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 438 days.

(21) Appl. No.: 18/242,071

(22) Filed: Sep. 5, 2023

(65) Prior Publication Data

US 2024/0075986 A1 Mar. 7, 2024

(30) Foreign Application Priority Data

Sep. 6, 2022 (DE) .................... 10 2022 122 520.8

(51) Int. Cl.
*B62D 21/15* (2006.01)

(52) U.S. Cl.
CPC .................................. *B62D 21/152* (2013.01)

(58) Field of Classification Search
CPC ....... B62D 21/152; B62D 21/15; B62D 25/08
USPC ............................ 296/187.09; 293/132, 136
See application file for complete search history.

(56) References Cited

U.S. PATENT DOCUMENTS

| | | | |
|---|---|---|---|
| 6,591,949 B2 | 7/2003 | Kitano et al. | |
| 10,112,561 B2 * | 10/2018 | Shin | ........................ B60R 19/44 |
| 10,800,366 B2 | 10/2020 | Adler et al. | |
| 2004/0056469 A1 | 3/2004 | Karaki et al. | |

FOREIGN PATENT DOCUMENTS

| | | | |
|---|---|---|---|
| CN | 109311440 | A | 2/2019 |
| DE | 4423741 | A1 | 1/1996 |
| DE | 10242282 | C1 | 12/2003 |
| DE | 60027710 | T2 | 9/2006 |
| DE | 102009053369 | A1 | 5/2011 |
| DE | 102009053764 | A1 | 5/2011 |
| DE | 102017005978 | A1 | 12/2018 |
| DE | 102017008031 | A1 | 2/2019 |
| EP | 2551160 | A2 | 1/2013 |
| KR | 20060053596 | A | 5/2006 |

OTHER PUBLICATIONS

Great Britain Combined Search and Examination Report for Application No. GB2311900.1, dated Jan. 15, 2024, 3 pages.
Great Britain Examination Report dated Jul. 11, 2024, for Application No. GB2311900.1. (1 page).

(Continued)

*Primary Examiner* — Hai H Huynh
(74) *Attorney, Agent, or Firm* — Buchanan Ingersoll & Rooney PC

(57) ABSTRACT

A vehicle front frame assembly with two supporting lateral longitudinal beams, whose front ends are connected to each other by a crash flat belt assembly stretched in the transverse direction. The crash flat belt assembly is formed from a closed flat belt loop, whose two deflection sections each sit on a round deflection body. The two deflector bodies themselves are fixed to the longitudinal beam front ends.

11 Claims, 3 Drawing Sheets

(56) References Cited

OTHER PUBLICATIONS

Office Action (Notice of Reasons for Refusal) issued Jun. 19, 2024, by the Japanese Patent Office in corresponding Japanese Patent Application No. 2023-137696 and an English translation of the Office Action. (7 pages).
Office Action (Notice of Reasons for Refusal) issued Dec. 4, 2024, by the Japanese Patent Office in corresponding Japanese Application No. 2023-137696 and an English translation of the Office Action. (6 pages).

* cited by examiner

VEHICLE FRONT FRAME ASSEMBLY

CROSS-REFERENCE TO RELATED APPLICATION

This application claims priority to German Patent Application No. 10 2022 122 520.8, filed Sep. 6, 2022, the content of such application being incorporated by reference herein in its entirety.

FIELD OF THE INVENTION

The invention relates to a vehicle front frame assembly having a frame structure absorbing crash energy.

BACKGROUND OF THE INVENTION

The crash energy is absorbed by the vehicle front frame assembly by plastically deforming elements of the front frame assembly. A typical vehicle front frame assembly has a supporting lateral longitudinal beam on each side of the vehicle in the area of the vehicle floor. The longitudinal beams absorb the majority of the crash energy in the event of a frontal impact of the vehicle. In a so-called impact accident, however, the vector of crash energy may miss the longitudinal beams almost entirely.

Various vehicle front frame assemblies are known from DE 10 2009 053 764 A1, US 2004 056 469 A1, DE 10 2017 008 031 A1 and DE 60 027 710 T2, which are each incorporated by reference herein in their entirety, that comprise a flat belt that has been stretched in the vehicle transverse direction between the front ends of the two longitudinal beams for improved absorption of the crash energy in a frontal impact accident. In the event of a central frontal impact accident, the crash energy is introduced into the longitudinal beams by the flat belt. However, the crash-resistant installation of the flat belt at the front ends of the longitudinal beams requires great effort.

SUMMARY OF THE INVENTION

Described herein is a vehicle front frame assembly with a crash flat belt assembly that is easily and reliably mounted at the front ends of the longitudinal beams in a crash-resistant manner.

The vehicle front frame assembly according to aspects of the invention comprises two supporting lateral frame longitudinal beams, which are preferably arranged in the floor region of the relevant vehicle. The front ends of the two lateral frame longitudinal beams are physically connected to each other by at least one crash flat belt assembly stretched in the transverse direction of the vehicle. According to aspects of the invention, the crash flat belt assembly is formed by a closed tubular belt or flat belt loop, whose two lateral 180° deflection sections are each seated on a separate round deflection body. The two deflector bodies themselves are fixed directly to the longitudinal beam front ends, for example bolted to them. The flat belt is therefore not fixed directly to the longitudinal beam front ends, so that strength-weakening changes to the structure of the flat belt in this area due to compression, direct bolting, bonding, etc. are also eliminated. The flat belt or tubular belt can be made of flexed, flat-woven or knitted or braided tubular belt whose ends are either arranged to overlap and sewn together in the overlap region or which is designed seamlessly as a closed ring.

The deflector body can generally be rounded in some way, for example in an oval shape. Preferably, the deflector body is formed to be externally cylindrical so that the semi-cylindrical deflection section of the flat belt loop wraps around the deflector body in a semi-cylindrical manner in each case.

The two deflector bodies can be bolted to the longitudinal beam front ends, for example. In particular, the two deflection sections of the flat belt loop can already be firmly connected to the round deflection body prior to assembly on the longitudinal beams, for example by plastic overmolding with a positive and captive connection to the deflection body. This ensures a simple and crash-resistant assembly of the crash flat belt assembly on the two longitudinal beams.

Preferably, the crash flat belt assembly has exactly two flat belt loops arranged vertically one above the other. This does not necessarily mean that the two flat belt loops are exactly in a single vertical plane, but preferably this is the case.

Preferably, the two deflector bodies of a vehicle transverse side are molded in a single plastic auxiliary frame, and in this way are positioned in a spatially defined manner to each other. The plastic auxiliary frame is essentially used for exact spatial arrangement and simplified assembly of the deflector bodies at the front ends of the longitudinal beams. In this way, the assembly of the vehicle front frame assembly is simplified to such an extent that it can be automated.

Preferably, the belt plane of the flat belt of the flat belt loop lies in a horizontal plane. In this way, the deflector bodies can be mounted in the longitudinal direction of the vehicle on or at the front ends of the two lateral longitudinal beams.

Preferably, the deflector bodies are each formed as hollow cylindrical sleeve bodies. Particularly preferably, the sleeve bodies each comprise a collar at their two sleeve ends. The collars hold the respective deflection section of the flat belt loop on the sleeve body so that the respective deflection section cannot slip off the sleeve body.

Preferably, the deflector bodies are each axially fixed or bolted directly to the respective longitudinal beam front end. In the present case, axial fixation means any fixation in which the sleeve body is fixed to the longitudinal beam front end by a longitudinally oriented fixation element. In particular, a longitudinally oriented bolt or threaded bolt is suitable for this purpose, for example.

Preferably, a crash box is provided on each side in the longitudinal direction in front of the crash flat belt assembly, wherein the two crash boxes support a bumper transverse support. With relatively low crash energy, the crash energy is thus only absorbed by the crash boxes, but not by the crash flat belt assembly.

BRIEF DESCRIPTION OF THE DRAWINGS

An exemplary embodiment of the invention will be explained in further detail in the following with reference to the drawings.

DETAILED DESCRIPTION OF THE INVENTION

Figure 1:
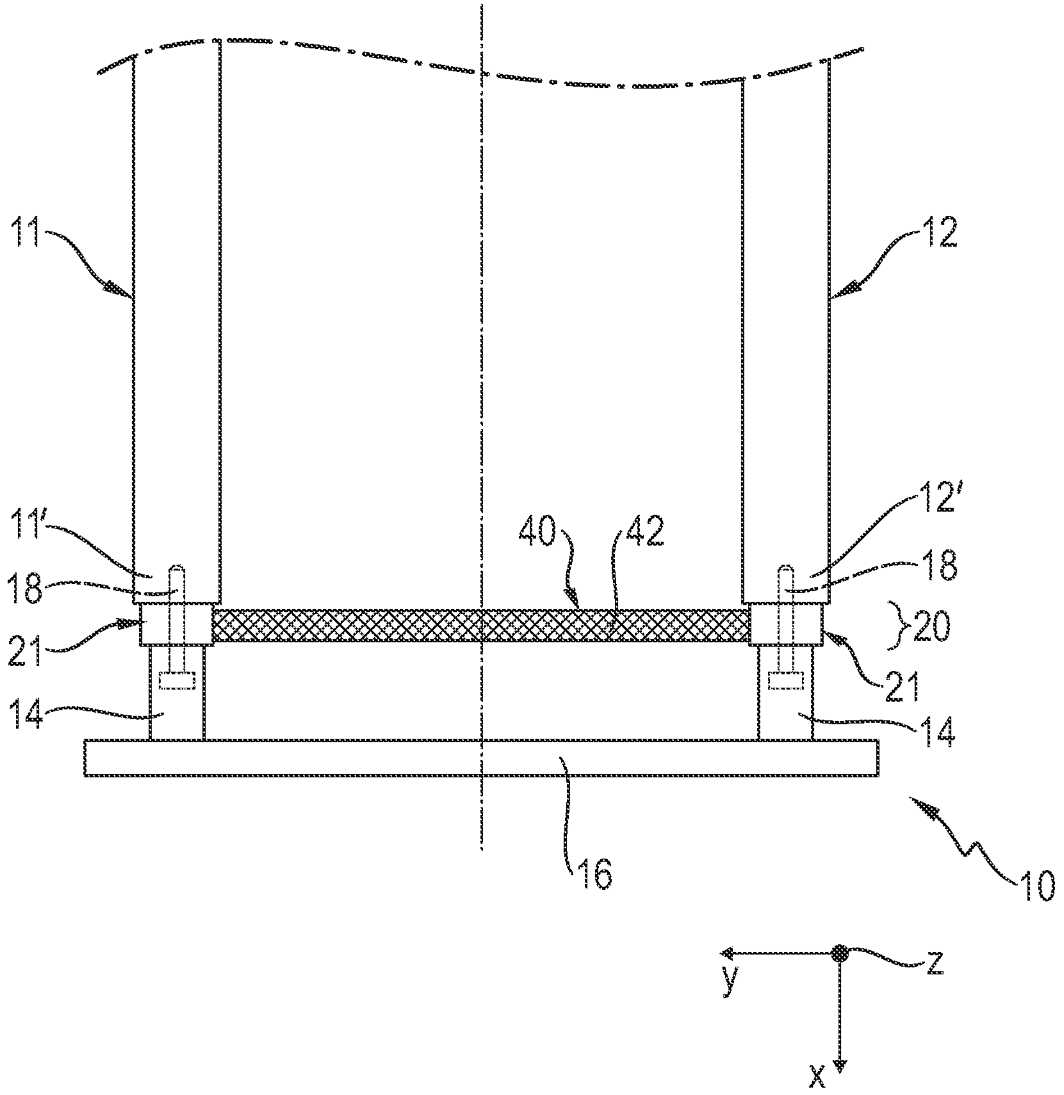
FIG. 1 is a plan view of a vehicle front frame assembly according to aspects of the invention with two lateral longitudinal beams and a crash flat belt assembly stretched in the transverse direction.

In FIG. 1, a top plan view of a vehicle front frame assembly 10 with two supporting lateral frame longitudinal beams 11,12 made of metal that are oriented in the vehicle longitudinal direction X. The two longitudinal beams 11,12 are arranged laterally in the floor region of the motor vehicle in question. The front ends 11', 12' of the two longitudinal beams 11,12 are connected to each other by a crash flat belt assembly 20, which is stretched in the vehicle transverse direction Y.

Figure 2:
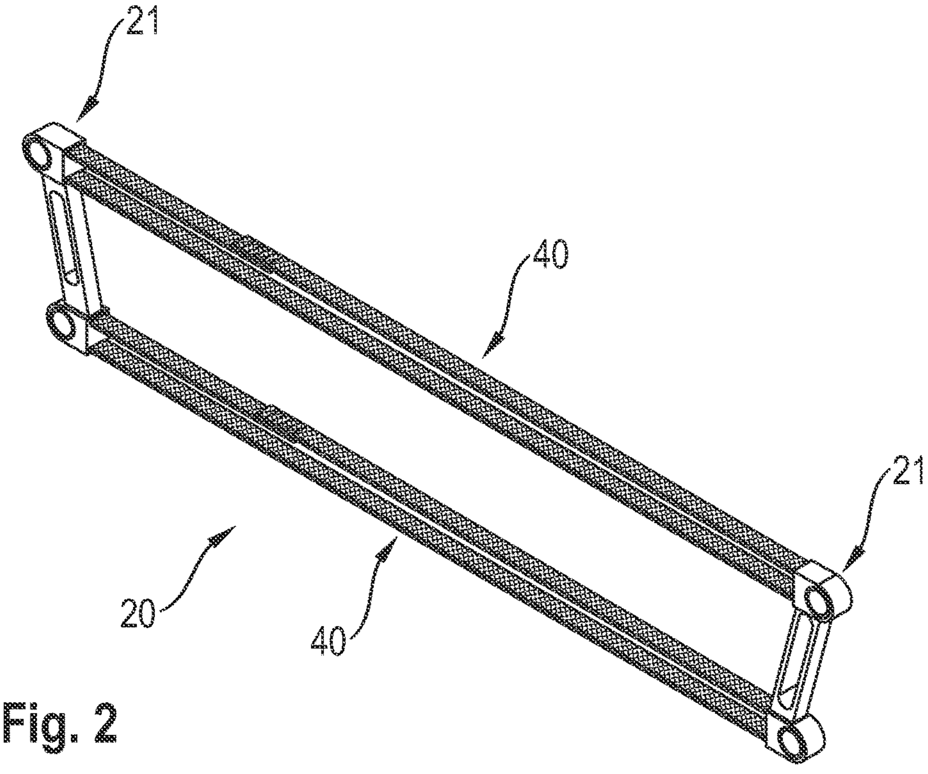
FIG. 2 depicts the crash flat belt assembly of FIG. 1 in an isolated perspective representation.
Figure 3:
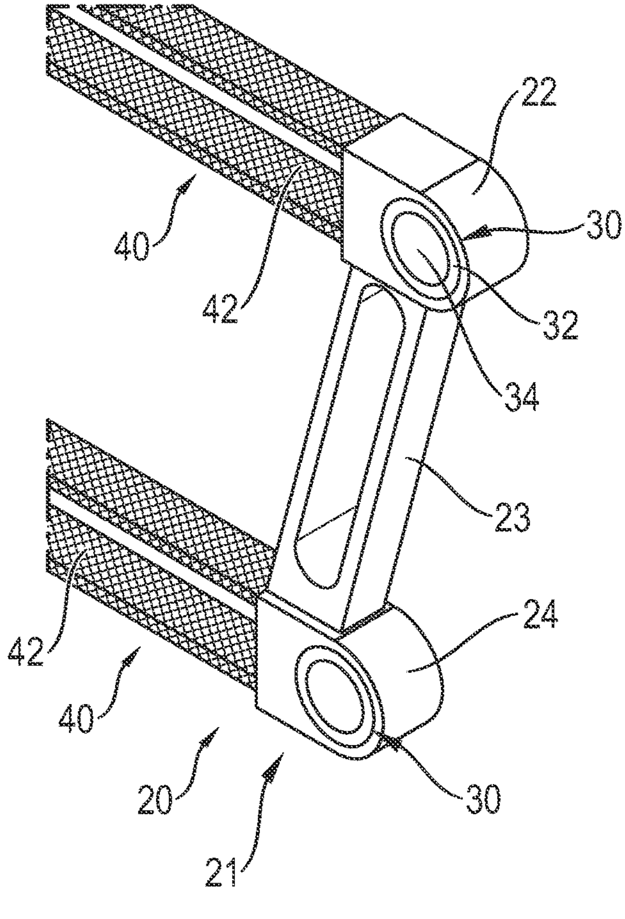
FIG. 3 depicts a plastic auxiliary frame of a transverse side of the crash flat belt assembly of the preceding figures.
Figure 4:
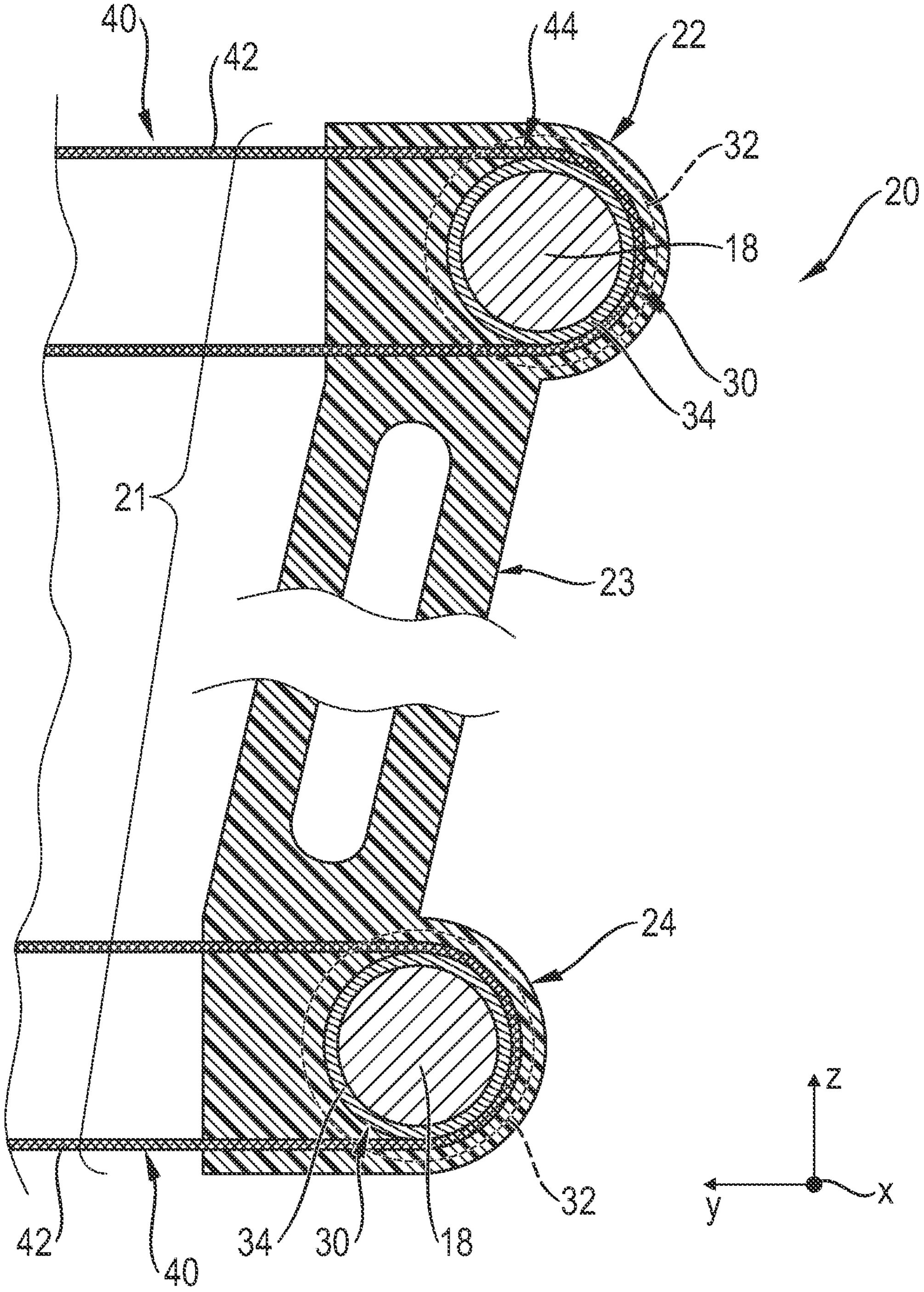
FIG. 4 depicts a vertical section IV-IV through the plastic auxiliary frame of FIG. 1.

The crash flat belt assembly 20 is shown in detail in FIGS. 2, 3 and 4. The crash flat belt arrangement 20 has two closed flat belt loops 40 arranged vertically one above the other and oriented in the vehicle transverse direction Y, both of which are in a single vertical plane Y, Z. The flat belt loop 40 is formed in each case by a flat belt 42 of high tensile strength in the direction of tension, which is woven, knitted or braided, for example, from continuous fibers. The continuous fibers may be composed of polyamide, polyethylene, aramid, carbon fibers, natural fibers, and/or basalt fibers. The flat belt 42 may comprise reinforcing fibers made of different materials. The closed flat belt loop 40 is formed by stitching the two ends of the flat belt. The belt plane of the flat belt 42 of the two flat belt loops 40 lies in a horizontal plane X, Y in each case. The flat belt loop 40 is fixed tightly but not significantly stretched in each case.

Each flat belt loop 40 is held and deflected at its two deflection sections 44 by a respective cylindrical sleeve-shaped metal deflection body 30. Each deflector body 30 has a respective hollow cylindrical sleeve body 34, at the two sleeve ends of which each have an annular disc-shaped sleeve collar 32, which holds the deflection section 44 of the flat belt loop 40 in the vehicle longitudinal direction X on both sides on the sleeve body 34 so that the flat belt deflection section 44 cannot slip off the sleeve body 34.

The two deflection bodies 30 of a transverse side are each molded into a single plastic auxiliary frame 21, which has an upper frame head 22, a lower frame head 24 and a double connecting web 23 integrally connecting the two frame heads 22,24. The plastic auxiliary frame 21 may be formed to be fiber-reinforced. The plastic frame heads 22,24 each completely encompass the sleeve area of the deflector bodies 30 and in this way fix the respective deflection section 44 of the relevant flat belt loop 40 to the relevant deflection body 30 with a positive fit.

The hollow cylindrical deflection bodies 40 are each bolted to the respective front end on the face 11', 12' of the two longitudinal beams 11,12 by a fixing bolt 18 oriented in the longitudinal direction X. A crash box 14 is mounted on each of the two auxiliary frames 21 in front of them in the longitudinal direction X, wherein the two crash boxes 14 in turn support a bumper transverse support 16 connecting them.

What is claimed is:

1. A vehicle front frame assembly comprising:
two supporting lateral longitudinal beams; and
a crash flat belt assembly connected to front ends of the two supporting lateral longitudinal beams, wherein the crash flat belt assembly is stretched in a transverse direction between the longitudinal beams,
wherein the crash flat belt assembly comprises (i) round or rounded deflection bodies that are respectively fixed to the front ends of the longitudinal beams and (ii) a closed flat belt and/or tubular belt loop, wherein deflection sections of the closed flat belt and/or tubular belt loop are each respectively seated on one of the deflection bodies of the crash flat belt assembly,
wherein a belt plane of the flat belt of the belt loop lies in a horizontal plane.

2. The vehicle front frame assembly according to claim 1, wherein two of the deflection bodies are molded into a single plastic auxiliary frame.

3. The vehicle front frame assembly according to claim 1, wherein the deflection bodies are hollow cylindrical sleeve bodies.

4. The vehicle front frame assembly according to claim 1, wherein each deflection body is directly fixed to a front end of one of the longitudinal beams.

5. The vehicle front frame assembly according to claim 1, wherein the crash flat belt assembly has two ends connected to each other to form a closed flat belt and/or tubular belt loop.

6. The vehicle front frame assembly according to claim 5, wherein the ends are connected to each other by sewing, clamping, and/or welding the ends of the flat belt and/or the tubular belt.

7. The vehicle front frame assembly according to claim 1, wherein ends of the crash flat band assembly are connected by sewing, clamping and/or welding the ends to a central region of the flat belt and/or the tubular belt to form a loop of the flat belt and/or the tubular belt that is closed at both ends.

8. The vehicle front frame assembly according to claim 1, wherein the crash flat belt assembly is an endless closed flat belt and/or tubular belt loop without free ends.

9. A vehicle comprising the vehicle front frame assembly according to claim 1.

10. A vehicle front frame assembly comprising:
two supporting lateral longitudinal beams;
a crash flat belt assembly connected to front ends of the two supporting lateral longitudinal beams, wherein the crash flat belt assembly is stretched in a transverse direction between the longitudinal beams; and
crash boxes supporting a bumper transverse support in a longitudinal direction in front of the crash flat belt assembly,
wherein the crash flat belt assembly comprises (i) round or rounded deflection bodies that are respectively fixed to the front ends of the longitudinal beams and (ii) a closed flat belt and/or tubular belt loop, wherein deflection sections of the closed flat belt and/or tubular belt loop are each respectively seated on one of the deflection bodies of the crash flat belt assembly.

11. A vehicle front frame assembly comprising:
two supporting lateral longitudinal beams; and
a crash flat belt assembly connected to front ends of the two supporting lateral longitudinal beams, wherein the crash flat belt assembly is stretched in a transverse direction between the longitudinal beams,
wherein the crash flat belt assembly comprises (i) round or rounded deflection bodies that are respectively fixed to the front ends of the longitudinal beams and (ii) a closed flat belt and/or tubular belt loop, wherein deflection sections of the closed flat belt and/or tubular belt loop are each respectively seated on one of the deflection bodies of the crash flat belt assembly, wherein the crash flat belt assembly comprises two flat belt loops arranged one above the other.

* * * * *